US007366582B2

United States Patent
Rantala et al.

(10) Patent No.: US 7,366,582 B2
(45) Date of Patent: Apr. 29, 2008

(54) METHOD FOR DEFINING STATUS INDEX IN COPPER ELECTROLYSIS

(75) Inventors: Ari Rantala, Porvoo (FI); Henri Virtanen, Pori (FI)

(73) Assignee: Outotec Oyj, Espoo (FI)

( * ) Notice: Subject to any disclaimer, the term of this patent is extended or adjusted under 35 U.S.C. 154(b) by 169 days.

(21) Appl. No.: 10/579,375

(22) PCT Filed: Nov. 26, 2004

(86) PCT No.: PCT/FI2004/000718

§ 371 (c)(1),
(2), (4) Date: May 12, 2006

(87) PCT Pub. No.: WO2005/052700

PCT Pub. Date: Jun. 9, 2005

(65) Prior Publication Data
US 2007/0125641 A1    Jun. 7, 2007

(30) Foreign Application Priority Data
Nov. 27, 2003  (FI) .................................. 20031733

(51) Int. Cl.
*G06F 19/00* (2006.01)
*G05B 13/04* (2006.01)

(52) U.S. Cl. .................. 700/145; 700/50; 700/266; 706/900

(58) Field of Classification Search .............. 700/173, 700/123, 145, 50, 266; 204/228.6, 228.1, 204/229.2; 205/84, 83; 706/900
See application file for complete search history.

(56) References Cited

U.S. PATENT DOCUMENTS

| 4,008,142 A | 2/1977 | Doring et al. | |
|---|---|---|---|
| 4,024,034 A | 5/1977 | Doring et al. | |
| 6,235,178 B1 * | 5/2001 | Tautz | 205/84 |
| 6,609,119 B1 * | 8/2003 | Meghlaoui | 706/25 |

FOREIGN PATENT DOCUMENTS

| DE | 19797981 | 9/1998 |
|---|---|---|
| JP | 5226541 | 9/1993 |
| JP | 5263299 | 10/1993 |
| JP | 5033197 | 3/2007 |
| KR | 2003053726 | 7/2003 |
| WO | 03000960 | 1/2003 |

OTHER PUBLICATIONS

Bergh et al. Control Engineering Practice 9 "Review of the art in Copper hydrometallurgic processes control" 2001, pp. 1007-1012.*

* cited by examiner

*Primary Examiner*—Leo Picard
*Assistant Examiner*—Steven R. Garland
(74) *Attorney, Agent, or Firm*—Smith-Hill and Bedell

(57) ABSTRACT

The invention is a method for controlling an electrolytic process and plant, utilizing history data collected in the process as well as mathematical and heuristic models created on the basis of empirical knowledge, and by means of said models, there are defined indexes based on real-time process measurement parameters. The method makes use of real-time cell voltage measurements. On the basis of the obtained real-time indexes, there is achieved a correctly focused process control action at the correct point of time.

20 Claims, 3 Drawing Sheets

METHOD FOR DEFINING STATUS INDEX IN COPPER ELECTROLYSIS

This is a national stage application filed under 35 USC 371 based on International Application No. PCT/FI2004/000718 filed Nov. 26, 2004, and claims priority under 35 USC 119 of Finnish Patent Application No. 20031733 filed Nov. 27, 2003.

The present invention relates to a method and arrangement for controlling an electrolytic process. More precisely, the invention relates to defining the real-time status of an electrolytic cell, process and plant, in order to obtain support for the process control decisions.

In the electrolytic processing of metals, the desired metal is precipitated on the surface of an electrode, i.e. cathode. The processing is carried out by electric current in an electrolytic cell, so that in the liquid, i.e. electrolyte contained in the cell, there are immersed in turn a number of sheet-like anodes and sheet-like cathodes made of an electroconductive material. The desired metal is made to be precipitated on the cathode either so that in the electrolytic treatment, there is used a soluble anode made of the same metal to be precipitated, or an insoluble anode. A soluble anode is used for example in the copper refining electrolysis (electrorefining) and an insoluble anode is used for example in the recovery electrolysis (electrowinning) of nickel or zinc.

In the electrolytic purification of copper, the impure so-called anode copper is dissolved by means of electric current, and the dissolved copper is reduced on the cathode sheet as very pure so-called cathode copper. The employed electrolyte is a sulfuric acid based copper sulfate solution. In the beginning of the process, the employed cathode sheet is a copper seed plate or a so-called permanent cathode that can be made of acid-proof steel or titanium. The employed power source in electrolysis is one or several rectifiers. The generally used power densities in electrolysis are 250-340 $A/m^2$, and the current is direct current (DC) or so-called periodically-reversed-current (PRC). The electrolysis take place in separate electrolytic cells, where the number of anode-cathode pairs varies in individual plants, typically between 30 and 80 pairs. The number of electrolytic cells in the plants also varies. The anodes are typically dissolved for 14-21 days, while the cathode cycle is 7-10 days.

As for the electrolytic process, information is collected by means of physical and chemical measurements. Regular measurement parameters are electrolyte temperature, composition, magnitude of electric current and cell voltage. On the basis of the available information, conclusions are made of the process status, and when necessary, control measures are taken for guiding the development of the process status in the correct direction.

However, it is difficult to obtain good, reliable and reproducible real-time information of the status and function of an electrolytic process. The measurement of the cell voltage offers the best possibility to follow the electrolytic process status and the faults developing therein with a relatively short response time. Changes in the cell voltage indicate several different process faults, such as short-circuits between electrodes, passivation of anodes, circulation problems of the electrolyte to the cells and faults connected to additive agents supply. For instance short-circuits developed between electrodes are often the first detected indication of a weakening process status, particularly if the number of occurring short-circuits is rapidly increased. The development of short-circuits between the anode and cathode can be detected as a drop in the cell voltage level. In this kind of a situation, the process conditions do not correspond to a status required by a good copper growth, and the process needs corrective control measures.

The international patent application WO 03/000960 describes a method for improving the current efficiency in electrolysis. According to said method, there is calculated a theoretical cell voltage, which is then compared with the measured cell voltage. The cumulative difference of theoretical and real cell voltages is continuously observed, and the current efficiency is evaluated on the basis thereof. The short-circuit elimination is focused in cell groups having the lowest efficiency.

However, problems are connected to utilizing the raw measurement results of cell voltages as such. The latest measured value is not feasible as such, but the trend of the cell voltage, i.e. its behavior with respect to time, as well as with respect to the measurement parameters represent more essential data. Thus the interpretation of the cell status on the basis of the results obtained from cell voltage measurements is based on applying the rules obtained through process experience. In an electrolytic plant, there are typically made 400-1000 voltage measurements at a time, because the number of measurements is the same as the number of cells in the plant in question, if the cell voltage is measured for each cell. Thus a trend and measurement specific voltage surveillance is impossible to be carried out manually. Moreover, on the basis of the absolute values of the cell voltage, the behavior of different cells cannot be compared, because the cell voltage level depends on the process conditions and parameters that vary from cell to cell.

The object of the present invention is to eliminate problems connected to the evaluation of the status of an electrolytic process and to realize a novel solution for controlling electrolytic processes and plants, wherein mathematical and heuristic models created on the basis of history data and empirical data collected from the process are utilized, so that there are defined, by means of said models, indexes based on real-time process measurement parameters. On the basis of the achieved real-time indexes, there is made a process control decision at the correct point of time and with a correct target.

Remarkable advantages are achieved by means of a method according to the invention. By means of the method, there is obtained a representative, real-time picture of the status of the electrolytic process in the form of obtained indexes. These indexes contain refined and combined information of several process parameters and their time-specific behavior. Now the number of parameters under observation is reduced without losing any information, when the electrolysis status should be defined. By means of the data offered by the method, rapid and correctly focused corrective action can be directed to the process status, which means that interference situations disturbing the production are avoided more effectively than before. By means of the invention, the cell statuses can be equally compared, because for each cell, there is defined a theoretical voltage by means of measurement parameters, with which the real voltage measurement values are compared. As for the index data created according to the invention, information of the condition of the cells can be clearly and effectively transmitted to operators and other operating staff. Moreover, the surveillance of the function of the whole process, as well as the grounds for control, become systematic.

In a method according to the invention, the statuses of an electrolytic plant process are surveyed on the basis of physical and chemical measurements, and the control parameters of the electrolytic process are changed for preventing and eliminating fault situations. The method is based on that by means of process and control data collected from the process in a long time span, there are created mathematical models and inference algorithms that can be realized by a computer for interpreting the trend of real-time measurement data collected from the process, which trend is then recorded in the computer memory. Further, the invention is based on simple events, where for each cell there is defined a theoretical cell voltage on the basis of measurements carried out periodically and regularly during the process and on the basis of a test model, and the real cell voltage for each cell is measured at a known point of time, the difference of theoretical and real voltage is calculated and the obtained difference value and said known point of time are recorded in the computer measurement buffer for generating a trend of the difference. The trend of the difference is interpreted by means of a mathematical model that is made in advance and stored in the computer memory. The result obtained from the difference interpretation is transformed into a status index describing the momentary, real-time status of the cell by means of a fuzzy and logic inference algorithm (Inference 1). In addition to the status index, there also is formed a condition index describing the cell status development within a longer period of time. The condition index is formed by means of a fuzzy inference algorithm, by utilizing both the status index and the measurement parameters (Inference 2). When one or several indexes surpass a predetermined normative value or drop below it, the process is controlled by changing selected process control parameters. Typically the target of a control decision is the guidance of short-circuit operations, the use of cell hoods, the maintenance of conductor rails, the control of electric current supply to the cell groups, the correctness of cell specific solution supply, the adjustment of additive supply and the flow-through of the electrolyte in the cells.

The created indexes can be a status index describing the momentary status of a single cell, or a condition index describing the status during a longer period of time. The indexes can be represented for example as a sliding figure between zero and one, in which case the index values one and zero indicate the process statuses good and bad, respectively. Indexes can be created for a single cell or a group of cells, depending on the physical location of the cell voltage measurements in the process. According to an embodiment of the invention, a cell specific index relates to a cell unit comprising one or several electrolytic cells, which unit has undergone cell voltage measurement.

The indexes can be further processed into various more informative pieces of discreet information, such as cell status class and event data. Fuzzy inference utilizes empirical information that is obtained, among others, from the empirical process knowledge of the plant operators. When defining the indexes, particularly the condition index, it is advantageous to take into account the age of the cathode.

The information of individual cells can be combined by calculatory means into data describing cell groups, and further to data describing the whole solution circulation. This makes it possible to observe the status of the whole electrolytic plant hierarchically on different levels, according to the process structure and process units.

DETAILED DESCRIPTION

Figure 1:
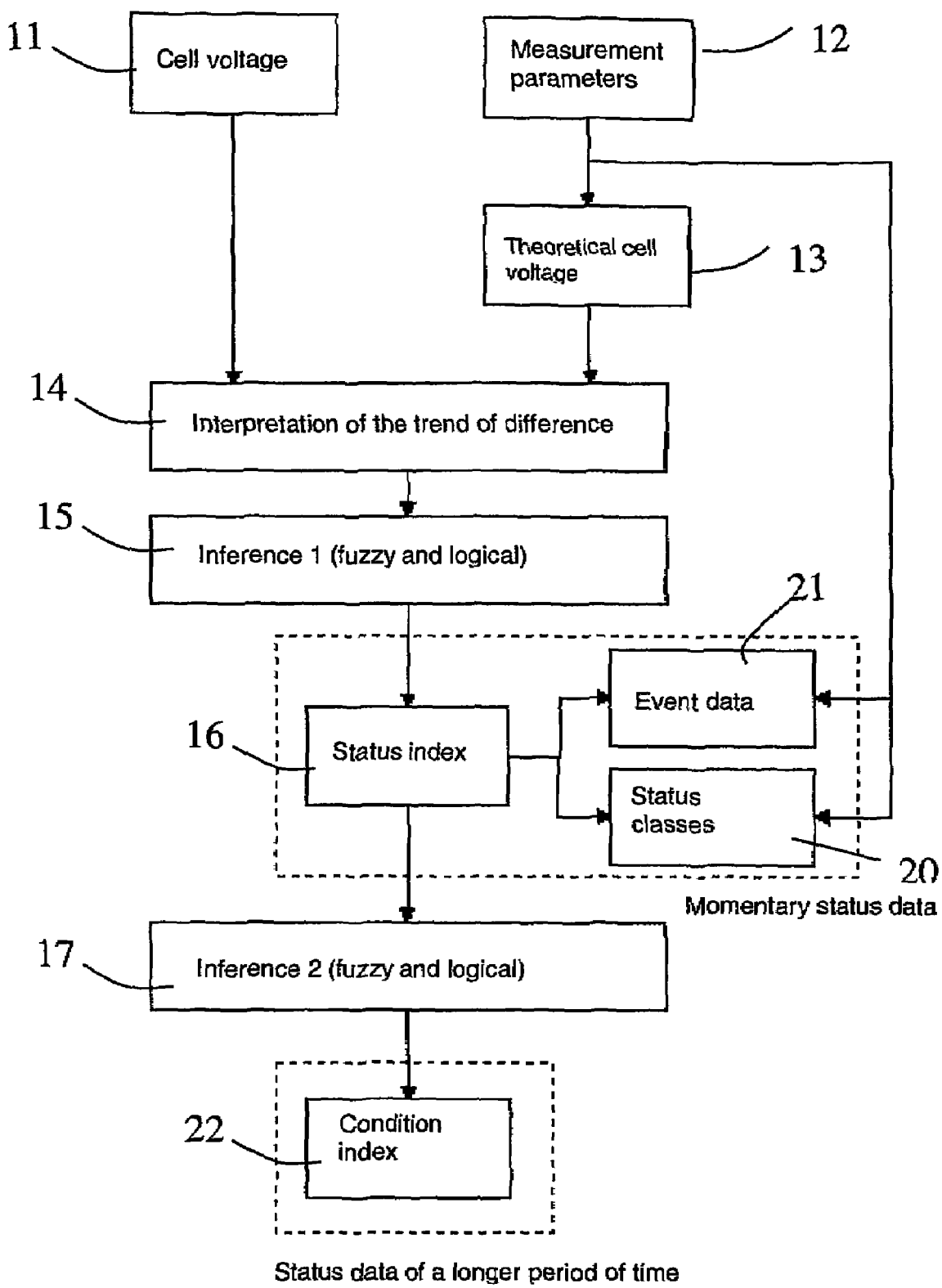
FIG. 1 is a diagram illustrating a method for calculating a cell specific status index and condition index.

In an embodiment of the invention according to FIG. 1, the results 11 from the cell voltage measurements are saved in the computer memory. The real-time measurement and process parameters 12, such as electrolyte temperature, electrolyte composition and the magnitude of electric current, are saved in the computer memory, and on the basis thereof, there is calculated a theoretical cell voltage 13 for the cell. The trend of the difference between the cell voltage and the theoretical voltage is formed, and the timewise behavior of the trend is interpreted by calculatory means 14, by a computer program and a mathematical model recorded in the computer memory. A trend comprises a number of differences represented as a function of time, typically in periods of 3-5 hours. Said trend is interpreted and fed into a mathematical model that produces the status index. The mathematical model is made on the basis of the process by means of process and control data collected within a long stretch of time. On the basis of the results from the interpretation of the voltage difference trend, and by means of a fuzzy and logic inference algorithm 15 recorded in the computer memory, there is formed a status index 16 describing the momentary status of the cell. The status index obtains the value [0 . . 1]. The fuzzy model applied in inference 15 includes empirical process knowledge of the behavior of an electrolytic process. Process knowledge can be collected for instance from process and control data. Advantageously the collection period is longer than half a year. The process and control data may comprise cell voltages, electrolyte temperatures, electric current supply data, electrolyte flow data and additive feed data.

The status index 16 can be used for observing the status of the cells and for making process control decisions as such, but according to a preferred embodiment of the invention, it is further utilized when composing discreet status class and event data 20, 21 that is more informative for the user, as well as a condition index 22 for a longer period of time and individually for each cell on the basis of a separate fuzzy inference algorithm. The composition of a condition index for a longer period of time is based on fuzzy inference, and in addition to the status index and process knowledge, there is utilized the growth time, i.e. age, of the cathodes placed in the cell, at each point of time under observation.

Figure 2:
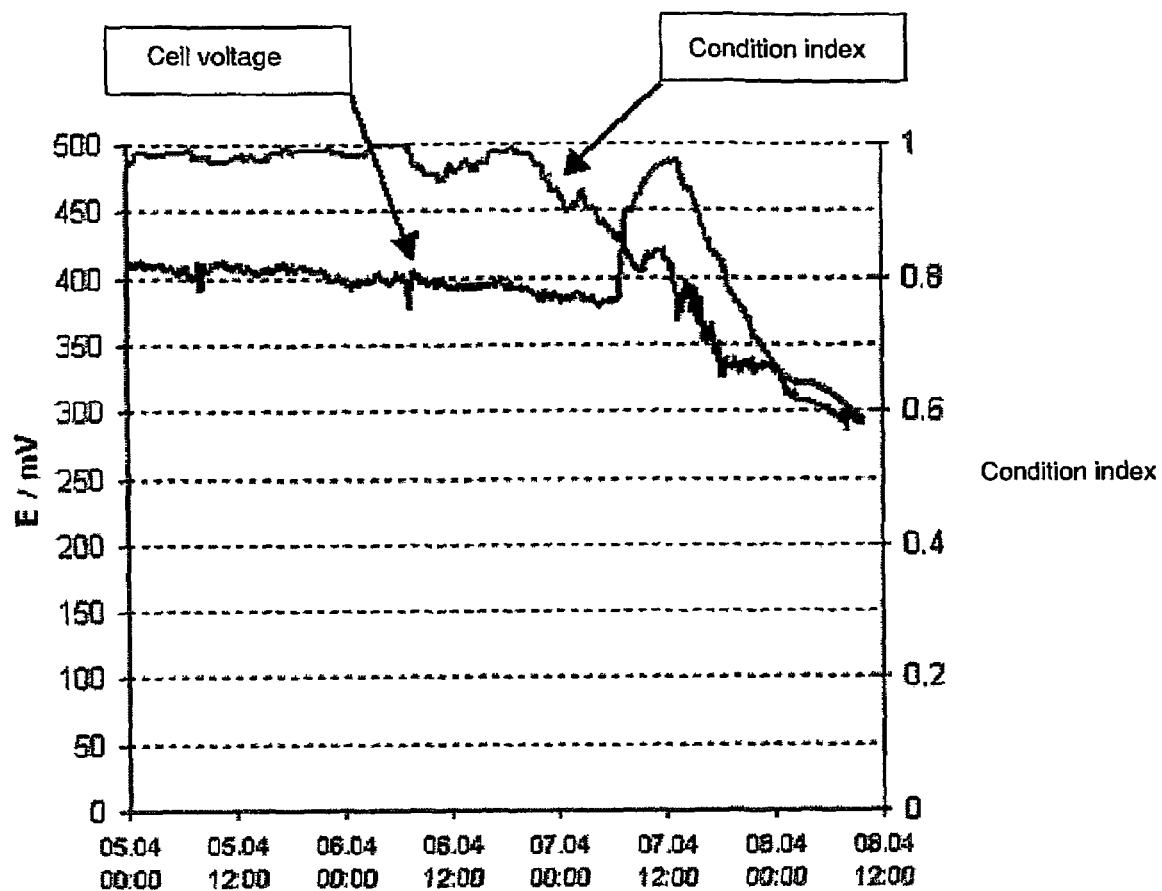
FIGS. 2 and 3 are graphical illustrations of the real-time information obtained according to the invention for observing the status of the electrolysis and for supporting control decisions.

FIG. 2 represents a graph of the recorded cell voltage measurement values at different points of time, as well as the values of the condition index formed according to the invention at respective points of time. By means of the condition index, the development of the condition of the cells is observed during a longer stretch of time, in the drawing for about four days. When the condition index approaches zero, this is an indication for the operator that the need to begin control measures is approaching. The computer is provided with means for presenting the cell voltage and the calculated condition index graphically, as a function of time on the computer display or other printout according to FIG. 2. The graphical representation is arranged to be updated every few minutes, in which case the staff of the electrolytic plant can follow in real-time the changes taking place in the process status.

Figure 3:
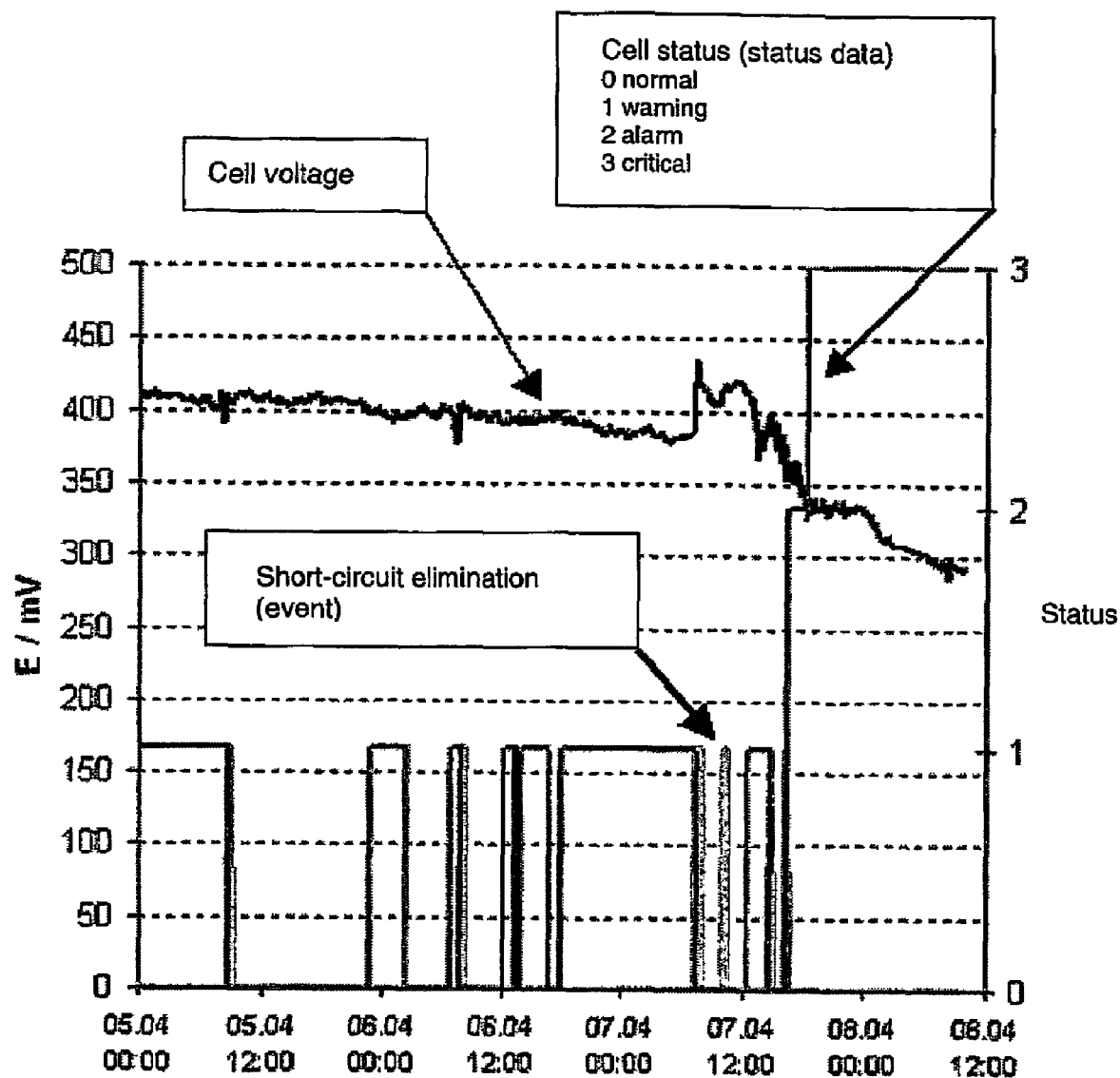

FIG. 3 is a graph illustrating some data composed according to the invention. The cell status class data is a discreet index, which in the example of the drawing may obtain the values 0, 1, 2 or 3. The status class data is more understandable for the user than the status index, and it clearly indicates whether the cell is in normal state, or whether it requires corrective action.

FIG. 3 is an example of event data, which means elimination of short-circuits. The event data informs the users of performed short-circuit elimination. The elimination of short-circuits represents event data that is also based on status index information and gives notice of a performed short-circuit elimination.

By means of the method of the invention, it is possible to control nearly any kind of electrolytic processes connected to the refining of metals, advantageously the electrolytic processes of copper, nickel and zinc.

EXAMPLE

In the electrolytic copper process in the Pori plant of Boliden Harjavalta Oy, the method according to the invention was applied to controlling and observing a cell group including 30 electrolytic cells. According to the method, the cells of the group were given real-time status and condition indexes, and there was also composed status class data on the basis of the cell voltages and process measurements.

Standard process measurement methods were used in the measurements of voltage, temperature, electric current and electrolytic composition. The measurements were connected to the plant automation system, from where they were transferred along the plant data network to a separate PC computer for composing the status, status class and condition indexes. The composition of the indexes was realized by software suited in real-time calculation, and the results were recorded in the database and the automation system.

The model used in the interpretation of the trend of the difference between the cell voltage and the theoretical voltage was created before the implementation of the method, by means of history data obtained from a longer stretch of time, i.e. by means of collected and recorded process and control data. The history data included cell voltages, electrolyte temperature, electric current supply, electrolyte flow, additive supply and electrolyte analysis from a period of a year in ten minute averages. In the calculation of the theoretical cell voltage, there was applied a multi-variable regression model composed in separate laboratory tests, where the input variables were the variables of the history data, with the exception of the cell voltage, which was a response variable. For the interpretation of the trend of the difference quantity, there was composed a principal component analysis model of the theoretical and cell voltage data.

The cell specific status index [0 . . 1] was formed at about ten minute intervals from the latest process measurements by means of a fuzzy model. The feed of the employed model constitutes the most significant principal components of the principal component analysis, the behavior of which according to the cell status is included in the fuzzy model rule base. The applied fuzzy model represented the Mamdani type of model. Also a Singleton-type of a fuzzy mode can be used. The rules were created on the basis of practical process knowledge.

On the basis of the status index created according to the method and on the basis of process measurements, for each cell there was formed, by means of logic inference and combining, status class data, where the cell status classification can be OK, warning, alarming or critical.

The condition index according to the invention was formed for each cell on the basis of the momentary status index value, old condition index values and the cathode age by means of a fuzzy model. In the fuzzy, Mamdani-type rule base, there was included practical process knowledge, so that the condition index corresponds to the real process status by the respective, above enlisted values of the feed variables.

In practice, the cell condition index data was utilized by forming, on the basis of the average of the condition indexes of the cells in the group, an index [0 . . 1] describing the condition of the whole group. By means of a longer-time variation of said index, developing process faults were observed at an early stage, as the index was sufficiently weakened. In addition, the index was used as support information for other control decisions, for instance in connection with decisions or raising or cutting down electric current.

When also other cells are connected to the surveillance according to the method, the condition and functionality of different cell groups can be compared equally and systematically. Poorly functioning groups, and thereby cells can be easily distinguished in the process, and the control measures can be focused on these. In addition, if for instance all groups are detected to function well, it is possible to consider a raise in the electric current, which increases the capacity of the plant respectively.

Status, status class and condition index data is presented through a www server that is located on the computer used for composing the indexes. The data is shown as simply and illustratively as possible for the cell workers, who can recognize problematic cells on any PC computer connected to the plant data network by means of a standard www browser. For example the elimination of short-circuits is thus made more efficient, because it is possible to concentrate on recognized problematic cells, and the well-functioning cells need not be disturbed with unnecessary supervision rounds.

The invention claimed is:

1. A method for controlling an electrolytic process in an electrolytic plant, in which method process statuses are interpreted on the basis of physical and chemical measurements, and electrolytic process control parameters are adjusted in order to prevent and eliminate fault situations, wherein process and control data collected from the process in a long time span is transformed into mathematical models and inference algorithms, which are recorded in computer memory, periodically and regularly during the process, there are calculated, by means of the created models and inference algorithms as well as real-time process measurement data, one or several indexes describing process status, in which case a theoretical cell voltage at a known point of time is defined by means of process measurements and an empirical model, a real cell voltage is measured at said point of time, the difference between the theoretical and real voltages is calculated, and a difference value and said point of time are recorded in the computer memory, and there is formed a trend of the difference, the trend of the difference in the voltages is interpreted by means of a mathematical model, the interpretation of the trend of the difference is transformed, individually for each cell, into a status index describing momentary status of the process by means of fuzzy and logic inference algorithms, and when one or several of the calculated indexes deviate from predetermined values, the process control parameters are adjusted for controlling the process.

2. A method according to claim 1, wherein a cell specific index relates to a unit of one or several electrolytic cells that has undergone a cell voltage measurement.

3. A method according to claim 1, wherein a created status index and process measurement parameters are also transformed, by means of a fuzzy inference algorithm, to a condition index describing development of a status of the process during a longer stretch of time.

4. A method according to claim 1, wherein the status index obtains a value between 0 and 1.

5. A method according to claim 1, wherein an index is a cell condition index, in which case age of a cathode in a cell is taken into account when calculating the index.

6. A method according to claim 1, wherein an index is a discreet status or event data, in which case in the calculation of the index, there is first calculated a cell specific status index describing the momentary status of the process, said status index being formed by means of fuzzy and logic inference algorithms, and on the basis of said status index and real-time process measurements, there is created said status or event data.

7. A method according to claim 1, wherein the process and control data comprises cell voltage, electrolyte temperature, electric current supply, electrolyte composition, electrolyte flow and additive supply.

8. A method according to claim 1, wherein when forming a model used in the interpretation of the trend of the difference, required process and control data is collected during a period of at least half a year in ten minute averages.

9. A method according to claim 1, wherein in the calculation of the theoretical cell voltage, there is used a multivariable regression model formed in separate laboratory tests.

10. A method according to claim 9, wherein the input variables in the regression model represent, apart from process and control data values, the cell voltage.

11. A method according to claim 1, wherein the interpretation of the difference in the cell voltage is carried out by a principal component analysis model formed of the theoretical and cell voltage data.

12. A method according to claim 1, wherein a fuzzy model used in the calculation of the status index describing the momentary status of the process is a model of Mamdani or Singleton type.

13. A method according to claim 12, wherein an employed feed for the fuzzy model used in the calculation of the status index, describing the momentary status of the process, constitutes the most significant principal components of a principal component analysis.

14. A method according to claim 12, wherein using a Mamdani type rule base, there is included process knowledge, so that a condition index corresponds to real process status by respective values of a feed variable.

15. A method according to claim 1, wherein on the basis of method indexes and information, there is controlled electrolytic process short circuit work in the electrolytic plant, use of cell hoods, maintenance of conducting rails, control of electric current supply into cell groups, correctness of cell specific solution supply, regulation of additive feed and flow-through of electrolyte in a cell.

16. A method according to claim 1, wherein the models or inference algorithms used for calculating the indexes represent real-time calculation software.

17. A method according to claim 1, wherein calculated indexes are recorded in a database.

18. A method according to claim 1, wherein calculated indexes are recorded in an automation system.

19. A method according to claim 1, wherein status, status class and condition index data is presented through a server that is located on a computer used for creating indexes.

20. A method according to claim 1, wherein the method is used for controlling electrolytic processes of copper, nickel and zinc.

* * * * *